United States Patent
Jao

(10) Patent No.: US 7,515,254 B2
(45) Date of Patent: Apr. 7, 2009

(54) REFLECTION-TESTING DEVICE AND METHOD FOR USE THEREOF

(75) Inventor: Ching-Lung Jao, Miao-li (TW)

(73) Assignee: Altus Technology Inc., Chu-Nan, Miao-Li Hsien (TW)

( * ) Notice: Subject to any disclaimer, the term of this patent is extended or adjusted under 35 U.S.C. 154(b) by 0 days.

(21) Appl. No.: 11/644,256

(22) Filed: Dec. 21, 2006

(65) Prior Publication Data

US 2007/0236683 A1    Oct. 11, 2007

(30) Foreign Application Priority Data

Apr. 7, 2006    (CN) .................. 2006 1 0060235

(51) Int. Cl.
*G01B 9/00* (2006.01)
(52) U.S. Cl. .................... 356/124; 356/239.2
(58) Field of Classification Search ............ 382/141, 382/152; 356/600–601, 612, 445–448, 239.7, 356/124–127, 239.1–239.3; 250/559.04–559.08, 250/578.1
See application file for complete search history.

(56) References Cited

U.S. PATENT DOCUMENTS

| | | | |
|---|---|---|---|
| 4,395,120 A * | 7/1983 | Takahashi | 356/125 |
| 2005/0041241 A1 * | 2/2005 | Pahk et al. | 356/237.1 |
| 2006/0192945 A1 * | 8/2006 | Hornauer et al. | 356/124 |
| 2006/0238748 A1 * | 10/2006 | Koest | 356/124 |

* cited by examiner

*Primary Examiner*—Gregory J Toatley, Jr.
*Assistant Examiner*—Tri T Ton
(74) *Attorney, Agent, or Firm*—Steven M. Reiss

(57) ABSTRACT

A reflection-testing device for testing for unwanted reflections in a lens module (12) includes a plurality of light sources (18) and an image capturer (16). The plurality of light sources is provided around the top end of the lens module, and the image capturer is provided near the other end of the lens module for receiving optical signals through the lens module. A lens reflection testing method is also disclosed.

13 Claims, 4 Drawing Sheets

REFLECTION-TESTING DEVICE AND METHOD FOR USE THEREOF

CROSS-REFERENCE TO RELATED APPLICATION

This application is related to a co-pending U.S. patent application Ser. No. 11/644,272 entitled "REFLECTION-TESTING DEVICE AND METHOD FOR USE THEREOF", by Ching-Lung Jao. Such application has the same assignee as the present application and is concurrently filed herewith. The disclosure of the above-identified application is incorporated herein by reference.

TECHNICAL FIELD

The present invention generally relates to reflection-testing devices and methods for use thereof.

BACKGROUND

Nowadays, digital camera modules are in widespread use. Portable electronic devices such as mobile phones and personal digital assistants (PDAs) are becoming increasingly multifunctional, and digital camera modules are now widely available as a special feature for portable electronic devices, consequently the integration of digital camera modules and portable electronic devices has become an important part of mobile multimedia technology.

In manufacturing, as a result of material tolerance dimensions, material surface roughness, reflection and refraction, material match issues, assembly processes and capabilities, and so on, some unacceptable levels of reflection may be found after the lens module has been assembled, even though such reflection might not appear during lens module design.

Typical reflection testing methods usually include the steps of providing a specific light source emitting on a lens module to be tested, moving the light source to different light source angles, and using it to detect the presence of unwanted reflections. However, while, in use, the lens module receives light from every direction at the same time, using the method above only can test the reflections in one specific direction of the lens module at the same time. The method above requires individual testing for reflections for each direction and therefore requires a relatively long time.

Accordingly, what is needed is a reflection-testing device and method with greater efficiency.

SUMMARY OF THE INVENTION

In one aspect thereof, a reflection-testing device for reflection testing of a lens module includes a plurality of light sources and an image capturer, wherein the plurality of light sources are placed around the top end of the lens module and the image capturer is provided near the other end of the lens module for receiving an optical signal through the lens module.

In another aspect thereof, a reflection testing method for a lens module comprises the following steps: providing a plurality of light sources and placing them around a top surface of the lens module; providing an image capturer and placing it near the other end of the lens module; receiving the optical signal through the lens module and forming an image using the image capturer; and testing for the presence of unwanted reflections in the image.

Other advantages and novel features will become more apparent from the following detailed description when taken in conjunction with the accompanying drawings.

BRIEF DESCRIPTION OF THE DRAWINGS

Many aspects of the reflection-testing device and method can be better understood with reference to the following drawings. The components in the drawings are not necessarily drawn to scale, the emphasis instead being placed upon clearly illustrating the principles of the present reflection-testing device. Moreover, in the drawings, like reference numerals designate corresponding parts throughout the several views.

DETAILED DESCRIPTION OF THE PREFERRED EMBODIMENTS

Figure 1:
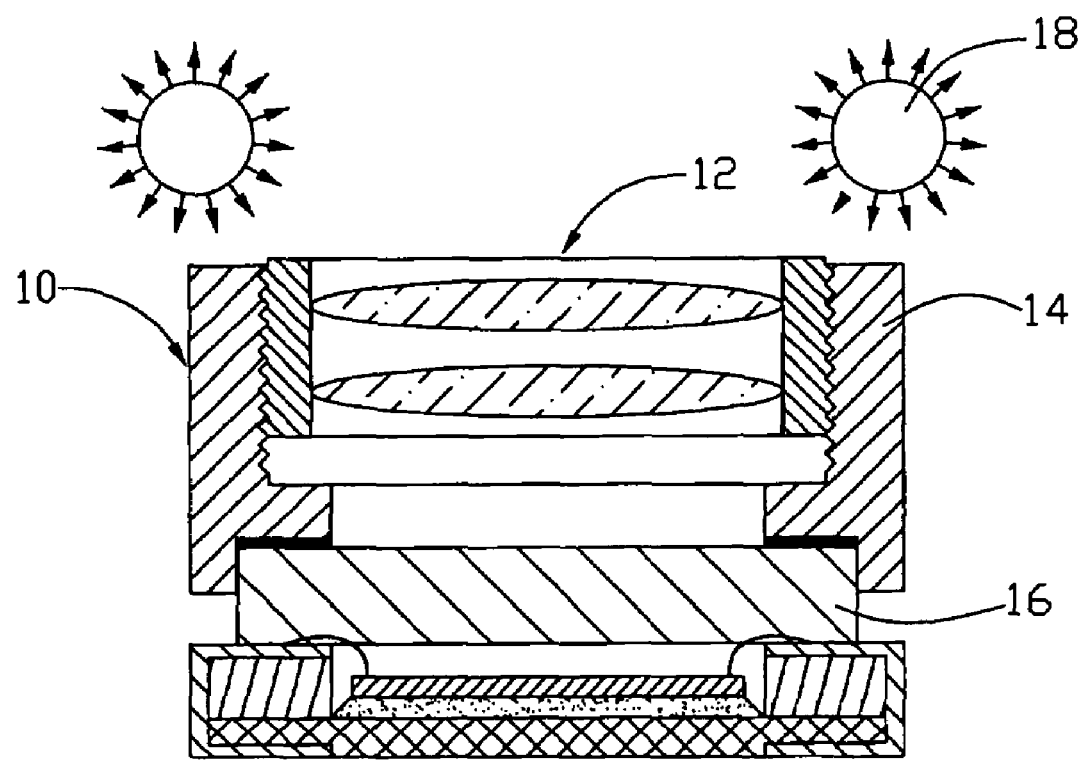
FIG. 1 is a cross-sectional view of a reflection-testing device, in accordance with a first embodiment.
Figure 2:
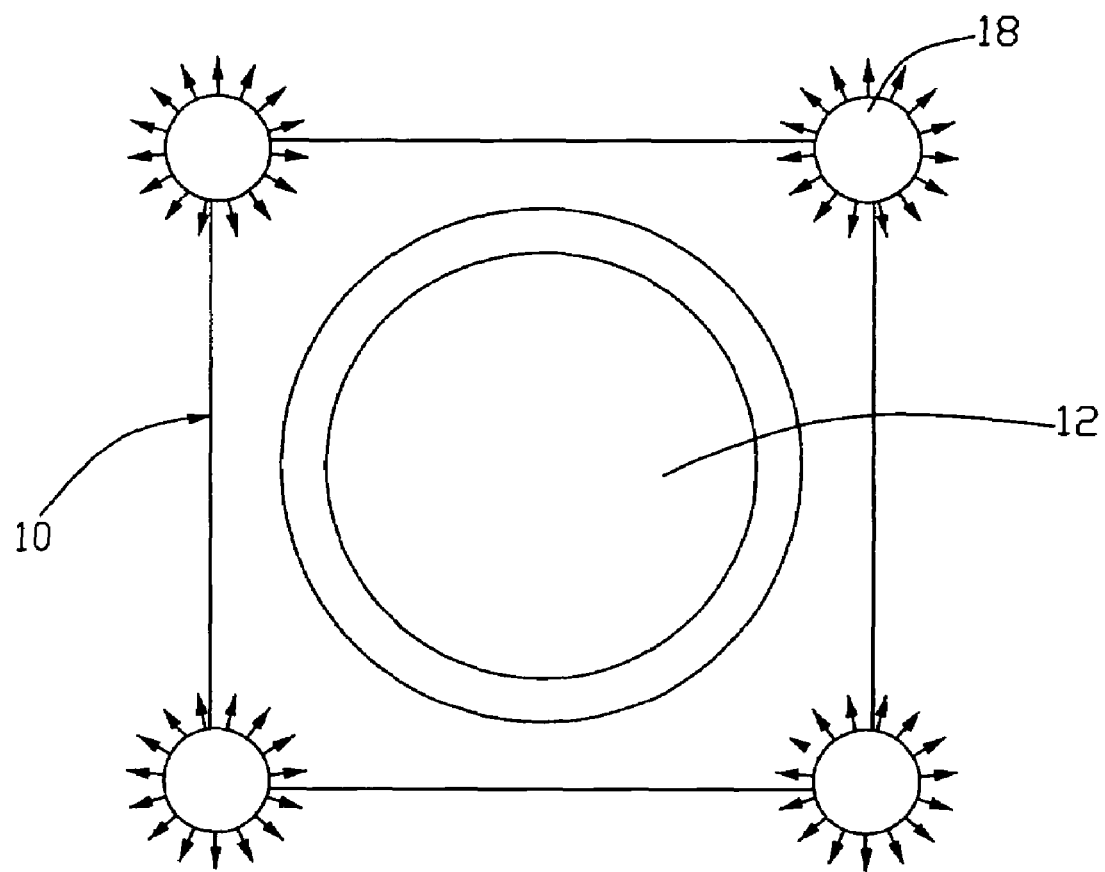
FIG. 2 is a top plan view of the reflection-testing device, in accordance with the first embodiment.

Referring to FIG. 1 and FIG. 2, a first embodiment of a reflection-testing device is designed for testing unacceptable levels of reflection for optical devices such as cameras and telescopes. In the description, the optical device is a camera module 10.

The camera module 10 includes a lens module 12 and a barrel 14. The barrel 14 is a hollow cylinder with the lens module 12 received therein.

The first embodiment of the reflection-testing device includes an image capturer 16, a plurality of light sources 18, and a signal processor (not shown). The signal processor is electronically connected with the image capturer 16. The image capturer 16 is provided near one end of the barrel 14. The image capturer 16 is an image sensor of a camera assembly to be tested.

The plurality of light sources 18 is provided for microscope illuminating and the common illuminating. The plurality of light sources 18 can be a light bulb (e.g., filament-type or fluorescent light source), light-emitting diode (LED) or another kind of light source. The number of the plurality of light sources 18 is four in the embodiment. The plurality of light sources 18 is provided near the other end of the barrel 14 to emit an annular light to simultaneously illuminate the lens module 12 from a plurality of different directions. The plurality of light sources 18 and the lens module 12 all can be moved along an optical axis of the lens module 12, so that a distance between the plurality of light sources 18 and the camera module 10 can be adjusted. In testing, the plurality of light sources 18 can be moved along the optical axis of the lens module 12 to emit light beams in different directions (e.g., at different angles relative to an upper surface of the lens module 12) for reflection testing. Several large-area light sources can be provided instead of the plurality of light sources 18, hence the rays of light can simultaneously illuminate the lens module 12 without moving the large-area light sources or the lens module 12 during testing.

An image is formed by rays of light transmitted through the lens module 12. The image is picked by the image capturer 16 and sent to the signal processor. The signal processor judges whether the lens module 12 is acceptable or not based on the received image.

Figure 3:
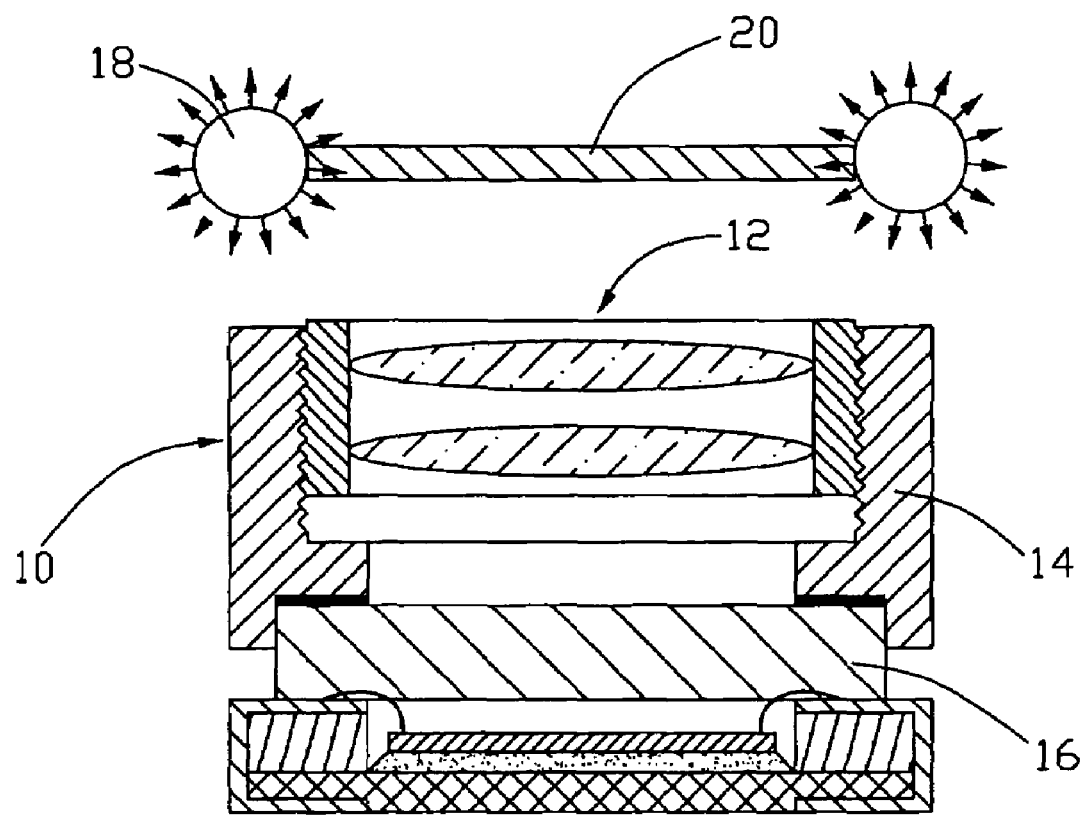
FIG. 3 is a cross-sectional view of the reflection-testing device with a baffle, in accordance with the first embodiment.

Further referring to FIG 3, a baffle 20 is provided in a center of the plurality of light sources 18. The baffle 20 faces towards the lens module 12 to make the lens module 12 reflections more easily distinguishable. The area of the baffle 20 is approximately equal to the area of the cross section of the lens module 12, so that the rays of light from the light sources 18 can form a more completely annular light. That is, the plurality of light sources 18 are arranged in a circle, and the inner diameter of the circle is approximately equal to the inner diameter of the barrel 14, and also is approximately equal to the lens module 12.

Figure 4:
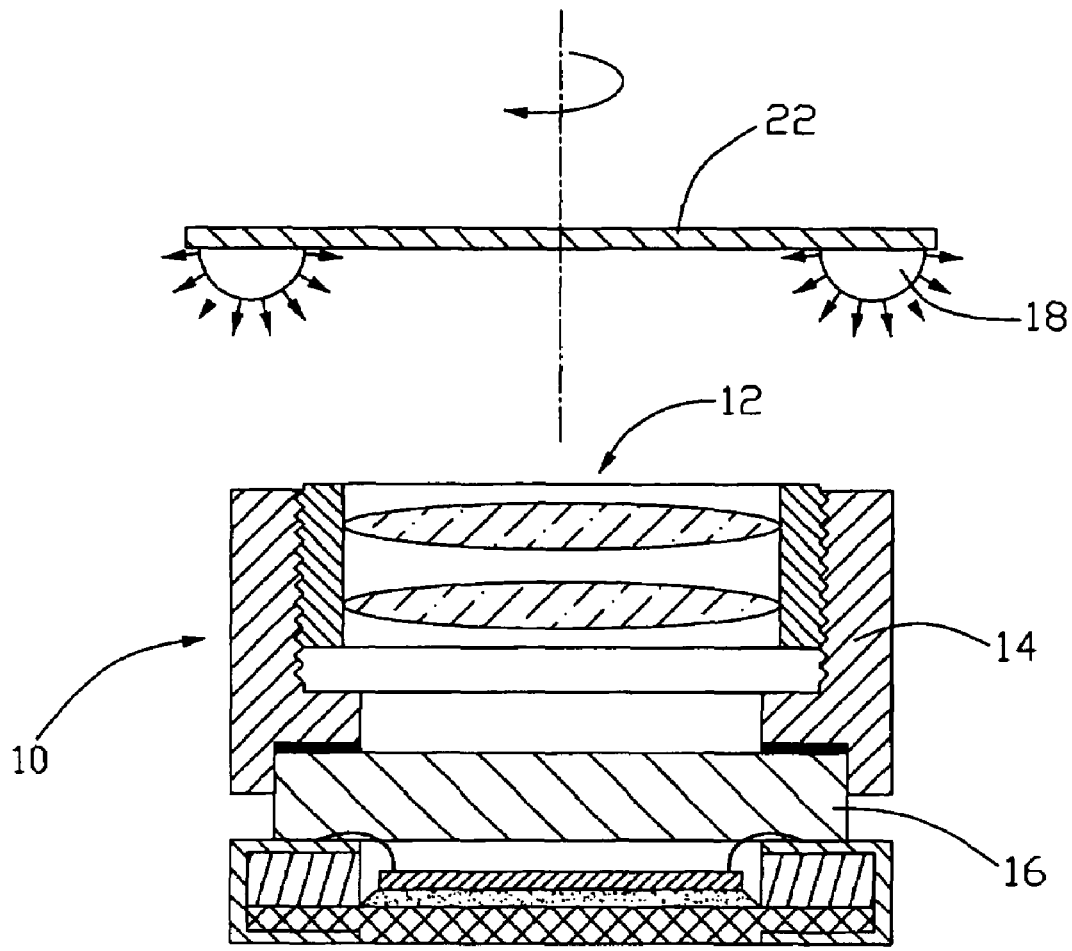
FIG. 4 is a cross-sectional view of the reflection-testing device, in accordance with a second embodiment.

Referring to FIG. 4, in a second embodiment of the reflection-testing device, a turn sheet 22 is provided. The plurality of light sources 18 is fixed on a surface of the turn sheet 22 and face towards the lens module 12. In test, the turn sheet 22 is rotated about the optical axis of the lens module 12 to make the plurality of light sources 18 similarly to be an annular-shaped light source, so that the plurality of light sources 18 can emit an annular light to test the reflection of the camera module 10 from different directions. Of course, the light sources 18 can also be instead large-area light sources.

It should be understood that the number of the light sources 18 or the large-area light sources is not limited to four. The number can be increased or decreased, if need be.

The reflection testing method employing the reflection-testing device includes the following steps:

providing a plurality of light sources 18 and placing the plurality of light sources 18 around the top surface of the lens module 12;

providing an image capturer 16 and placing the image capturer 16 near the other end of the lens module 12;

providing a signal processor connected with the image capturer 16; and receiving the optical signal through the lens module 12, forming an image by the image capturer 16, and sending the image to the signal processor.

The signal processor processes the received image to detect the reflection of the lens module 12.

It should be understood that the reflection of the lens module 12 could be detected by naked eye according to the image received by the image capturer 16, so that the signal processor can be omitted. The reflection-testing device and method can test for reflections from different directions of the lens module 12 simultaneously. Hence, the procedure of reflection testing can be simplified, and the frequency can be increased.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A reflection-testing device for testing unacceptable levels of a reflection of a lens module, comprising:
   a plurality of light sources provided around the top end of the lens module, the plurality of light sources being arranged in a circle, and an inner diameter of the circle being approximately equal to a diameter of the lens module, the plurality of light sources being fixed on one surface of a turn sheet and faces towards the lens module, and, during testing, the turn sheet being rotated about the optical axis of the lens module; and
   an image capturer provided near the other end of the lens module, the image capturer being configured for receiving an optical signal through the lens module.

2. The reflection-testing device as claimed in claim 1, wherein the light sources and the lens module both can be moved along an optical axis of the lens module.

3. The reflection-testing device as claimed in claim 1, wherein the light sources are one of common lamps, light-emitting diodes, and large-area light sources.

4. The reflection-testing device as claimed in claim 3, a baffle is provided in the center of the plurality of light sources, the baffle facing towards the lens module, wherein the area of the baffle corresponds to the area of the cross section of the lens module.

5. A reflection testing method for reflection testing of a lens module, comprising the following steps:
   providing a plurality of light sources around a top surface of the lens module, the light sources being fixed on one surface of a turn sheet and facing towards the lens module, and, during testing, the turn sheet being rotated about the optical axis of the lens module to make the plurality of light sources emit a generally annular light;
   providing an image capturer and placing it near the other end of the lens module;
   receiving an optical signal through the lens module and forming an image by the image capturer; and
   testing for the presence of unwanted reflections in the image.

6. A reflection testing method as claimed in claim 5, wherein the light sources and the lens module both can be moved along an optical axis of the lens module.

7. A reflection testing method as claimed in claim 5, wherein the light sources are one of common lamps, light-emitting diodes and large-area light sources.

8. The reflection testing method as claimed in claim 5, a baffle is provided in the center of the plurality of light sources, the baffle faces towards the lens module, wherein the area of the baffle corresponds to the area of the cross section of the lens module.

9. A reflection-testing device for testing unacceptable levels of a reflection, comprising:
   an optical device including a barrel and a lens module, the barrel being a hollow cylinder with the lens module received therein, the lens module comprising a plurality of lenses;
   a plurality of light sources provided around the top end of the barrel and emitting an annular light, the plurality of light sources being fixed on one surface of a turn sheet and faces towards the lens module, and, during testing, the turn sheet being rotated about the optical axis of the lens module; and
   an image capturer provided near the other end of the barrel, the image capturer being configured for receiving an optical signal through the lens module.

10. The reflection-testing device as claimed in claim 9, wherein the light sources and the lens module both can be moved along an optical axis of the lens module.

11. The reflection-testing device as claimed in claim 9, wherein the light sources are one of common lamps, light-emitting diodes, and large-area light sources.

12. The reflection-testing device as claimed in claim 9, wherein the plurality of light sources are arranged in a circle, and the inner diameter of the circle is approximately equal to the inner diameter of the barrel.

13. The reflection-testing device as claimed in claim 12, a baffle is provided in the center of the plurality of light sources, the baffle facing towards the lens module, wherein the area of the baffle corresponds to the area of the cross section of the lens module.

* * * * *